No. 889,675. PATENTED JUNE 2, 1908.
D. R. GLEZEN.
CUTTER BAR FOR MOWERS, &c.
APPLICATION FILED DEC. 17, 1907.
2 SHEETS—SHEET 1.
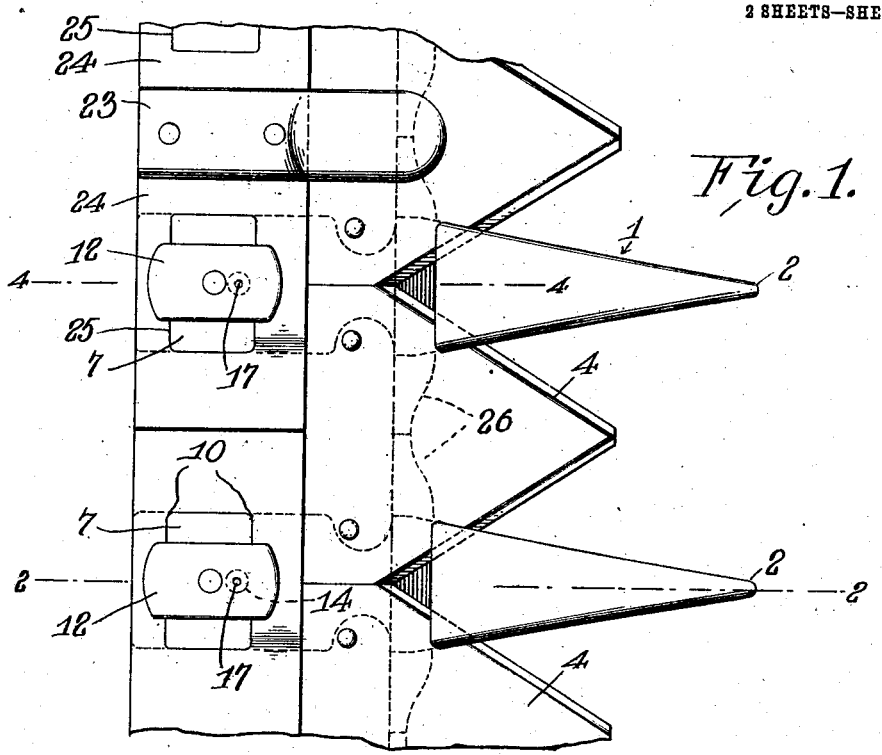
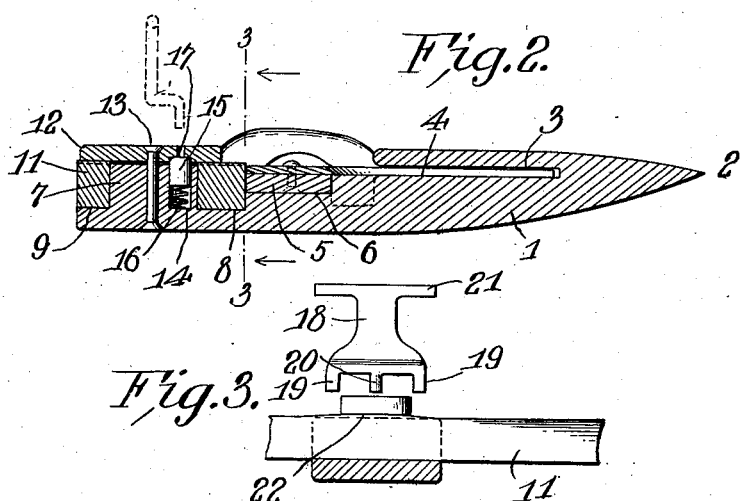
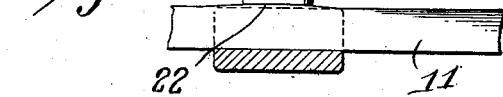
Witnesses
C. E. Smith.
P. M. Smith.
Inventor
Daniel R. Glezen.
By Victor J. Evans
Attorney No. 889,675. PATENTED JUNE 2, 1908.
D. R. GLEZEN.
CUTTER BAR FOR MOWERS, &c.
APPLICATION FILED DEC. 17, 1907.
2 SHEETS—SHEET 2.
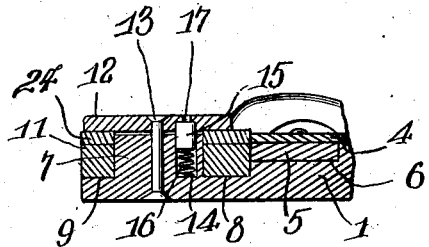
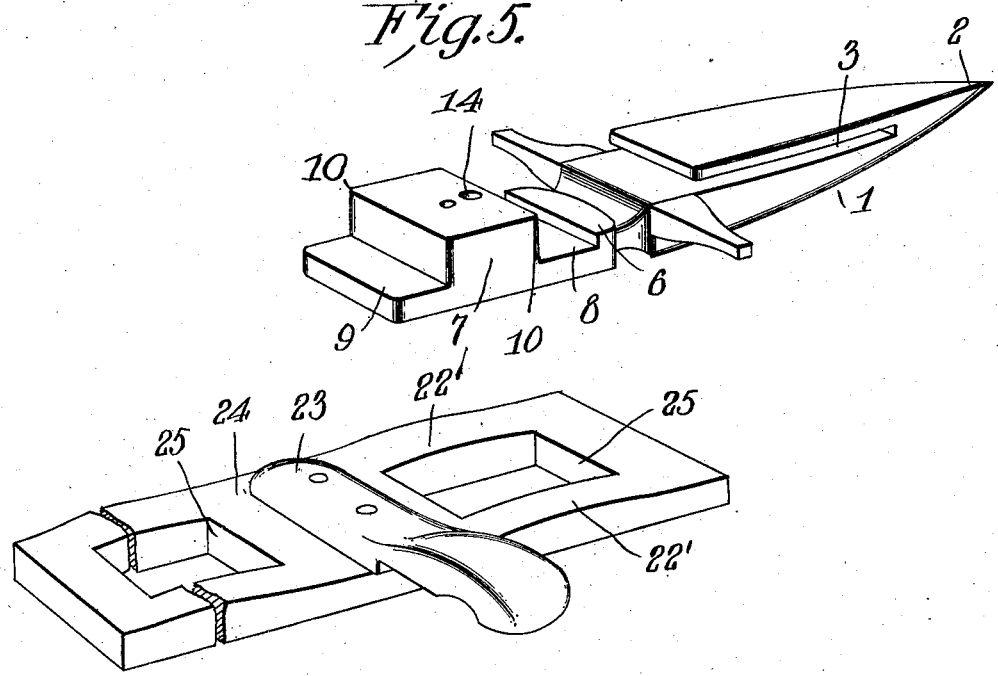
Witnesses
C. E. Smith.
K. Allen.
Inventor
Daniel R. Glezen.
By Victor J. Evans
Attorney

UNITED STATES PATENT OFFICE.

DANIEL R. GLEZEN, OF CENTER LISLE, NEW YORK.

CUTTER-BAR FOR MOWERS, &c.

No. 889,675.  Specification of Letters Patent.  Patented June 2, 1908.

Application filed December 17, 1907. Serial No. 406,917.

*To all whom it may concern:*

Be it known that I, DANIEL R. GLEZEN, a citizen of the United States, residing at Center Lisle, in the county of Broome and State of New York, have invented new and useful Improvements in Cutter-Bars for Mowers, &c., of which the following is a specification.

This invention relates to cutter bars for mowing machines, reapers and harvesting machines, the object of the invention being to provide an improved cutter bar having means whereby the guards are securely held in place and prevented from being sprung out of position; also means for securely holding the scythe buttons in proper position relatively to the cutter bar; also means for preventing side check of the guard.

A further object of the invention is to construct and combine the parts referred to in such manner that they may be readily assembled and disassociated with ease.

With the above and other objects in view, the nature of which will more fully appear as the description proceeds, the invention consists in the novel construction, combination and arrangements of parts, hereinafter fully described, illustrated and claimed.

In the accompanying drawings:—Figure 1 is a plan view of a section of a cutter bar embodying the present invention. Fig. 2 is a vertical cross section through the same on the line 2—2 of Fig. 1. Fig. 3 is a detail section on the line 3—3 of Fig. 2 showing the means for manipulating the fastener buttons. Fig. 4 is a vertical cross section taken on the line 4—4 of Fig. 1. Fig. 5 is a perspective view of one of the guards. Fig. 6 is a detail view of one of the scythe buttons.

Each of the guards 1, in the main, is of the usual form now in common use, being pointed at its forward end as shown at 2 and slotted in its upper portion as indicated at 3 to admit of the reciprocatory movement of the knife sections 4, the latter being secured in abutting relation to each other to a common knife bar 5 which moves in a corresponding recess 6 in the upper side of the guard as shown in Fig. 2. The rear portion of each guard is provided with an upstanding boss 7 which is formed by providing a cross groove 8 just in rear of the knife bar 5, and a cross rabbet 9 at the heel end of the guard, the groove 8 and rabbet 9 being of the same depth vertically. The upstanding boss 7 is of the same length as the width of the body portion of the guard, the width of the boss being somewhat less so that the boss is substantially rectangular in plan as shown in Fig. 1. By preference the corners of the boss are rounded off as shown at 10.

11 designates a guard bar which connects all of the guards together and is provided with openings of the same size, as the bosses 7, said openings being arranged at proper intervals apart to receive said bosses. The guard bar 11 is approximately of the same thickness as the height of the bosses 7 and is held down thereon by means of fastener buttons 12 each of which is approximately the same size and shape as the top of the boss 7 as shown in Fig. 1. Each button 12 is secured in place by means of a bolt or rivet 13 which passes through the button and body of the guard as shown in Fig. 2 being preferably countersunk and headed as shown. Each boss is further provided with a recess 14 extending from the upper side thereof downward and having fitted therein a vertically movable lock pin 15 which is pressed upward by means of an underlying coil spring 16 arranged in the recess 14. The button 12 is provided at a corresponding point in its under side with a recess adapted to receive the upper end of said lock pin as shown in Fig. 2, the pin being adapted to snap into the recess of the button and hold the same in position to fasten the guard bar to the guard, such position being illustrated in Fig. 1.

In order to disengage the lock pin from the button so as to allow such button to be turned into alinement with the boss, a small hole 17 is bored through the button 12 in line with the lock pin 15 and a key or spanner 18 is provided, the same having projections 19 adapted to straddle or span the button as shown in Fig. 3 and also provided with a centrally located bit 20 of suitable length to reach through the hole 17 and press the lock pin 15 downward just far enough to unlock the button 12 without causing the bit 20 to come in locking contact with the boss 7. The key or spanner 18 is provided with a suitable handle 21 whereby it may be turned after pressing the same downward and in this way each of the fastener buttons 12 may be unlocked and swung into alinement with its respective boss 7 when it is desired to detach the guards from the guard bar.

Adjacent to each of the buttons 12, the guard bar 11 is provided with a rise or cam surface 22 against which the under side of the buttons 12 rides so as to wedge or jam the guard and guard bar together as the button is turned to its locking position.

At suitable intervals along the cutter bar there are placed scythe buttons 23. Each of said buttons 23 lies at its forward projecting ends in close proximity to or contact with the cutter bar knife sections while the rear thereof is provided with oppositely extending wings 24 each of which is provided with an opening 25 of the same size as one of the bosses 7 whereby the wings 24 are adapted to straddle said bosses. As the wings 24, however, lie on top of the guard bar 11, it is necessary to make the corresponding bosses 7 of greater height as shown in Fig. 4 so that said bosses will extend through the guard bar and also through the wings 24 of the scythe button, as also clearly shown in Fig. 4. The fastener button 12 is secured to the top of the boss in the same manner as previously described, operates over cam surfaces 22' on the wing 24 and is also fastened by a locking pin in exactly the same manner.

In order to prevent side shock or relative lateral movement between the guards, each of said guards is provided with laterally projecting abutment lugs 26 which bear against each other end to end as illustrated by dotted lines in Fig. 1 and are located just in advance of the knife bar 5 thus providing a practically continuous bar for the front edge of said knife bar and also a practically continuous underlying support for the knife section 4.

I claim:—

1. The combination with a knife bar, of guards having upstanding flat sided bosses, a guard bar having correspondingly shaped holes to receive said bosses, fastener buttons on said bosses for securing the guard bar and guards together and means for locking said buttons.

2. The combination with a knife bar, of guards having upstanding flat sided bosses, a guard bar having correspondingly shaped holes to receive said bosses, fastener buttons on said bosses for securing the guard bar and guards together and spring locking pins for locking said buttons.

3. The combination with a knife bar, of guards having upstanding bosses, a guard bar having correspondingly shaped holes to receive said bosses, fastener buttons on said bosses for securing the guards and guard bar together, scythe buttons having apertured wings to receive said bosses and adapted to be held under the fastener buttons and means for locking the fastener buttons.

4. The combination with a knife bar, of guards having upstanding bosses, a guard bar having correspondingly shaped holes to receive said bosses, fastener buttons on said bosses for fastening the guard bar and guards, and oppositely projecting abutment lugs on the guards which meet beneath the knife sections.

In testimony whereof I affix my signature in presence of two witnesses.

DANIEL R. GLEZEN.

Witnesses:
F. J. INDERLIED,
E. M. HOWLAND.